United States Patent
Feugnet et al.

(10) Patent No.: US 7,446,879 B2
(45) Date of Patent: Nov. 4, 2008

(54) SOLID-STATE GYROLASER STABILISED BY ACOUSTO-OPTIC DEVICES

(75) Inventors: Gilles Feugnet, Les Ulis (FR); Didier Rolly, Marcoussis (FR); Jean-Paul Pocholle, La Norville (FR)

(73) Assignee: Thales, Neuilly sur Seine (FR)

( * ) Notice: Subject to any disclaimer, the term of this patent is extended or adjusted under 35 U.S.C. 154(b) by 43 days.

(21) Appl. No.: 10/556,795

(22) PCT Filed: Apr. 28, 2004

(86) PCT No.: PCT/EP2004/050629

§ 371 (c)(1),
(2), (4) Date: Nov. 15, 2005

(87) PCT Pub. No.: WO2004/102120

PCT Pub. Date: Nov. 25, 2004

(65) Prior Publication Data

US 2006/0285118 A1    Dec. 21, 2006

(30) Foreign Application Priority Data

May 16, 2003    (FR) .................................. 03 05902

(51) Int. Cl.
*G01C 19/66* (2006.01)
(52) U.S. Cl. ....................... 356/459; 356/472
(58) Field of Classification Search ................. 356/459, 356/471, 472
See application file for complete search history.

(56) References Cited

U.S. PATENT DOCUMENTS

| | | | | |
|---|---|---|---|---|
| 3,528,029 A | * | 9/1970 | Itzkan et al. | 372/94 |
| 3,790,898 A | * | 2/1974 | Gudmundsen et al. | 372/94 |
| 3,941,481 A | * | 3/1976 | Kramer | 356/472 |
| 4,405,236 A | * | 9/1983 | Mitsuhashi et al. | 356/459 |
| 4,869,579 A | * | 9/1989 | Fischer et al. | 359/299 |
| 5,241,555 A | * | 8/1993 | Spitzer | 372/94 |
| 5,367,377 A | | 11/1994 | Rahn | |
| 5,960,022 A | * | 9/1999 | Halldorsson et al. | 356/459 |
| 6,943,871 B1 | * | 9/2005 | Abedin | 356/73.1 |

FOREIGN PATENT DOCUMENTS

| | | | |
|---|---|---|---|
| CA | 1085499 A | * | 9/1980 |
| FR | 2825463 | | 12/2002 |
| GB | 2072936 A | * | 10/1981 |
| WO | 94/21012 A | | 9/1994 |

OTHER PUBLICATIONS

Buholz et al, Acoustic wave Amplitude Modulation of a Multimode Ring Laser, IEEE Journal of Quantum Electronics, vol. 3, No. 11, Nov. 1967, pp. 454-459.*

(Continued)

*Primary Examiner*—Samuel A Turner
(74) *Attorney, Agent, or Firm*—Lowe Hauptman Ham & Berner, LLP

(57) ABSTRACT

The field of the invention is that of solid-state laser gyros. One of the major problems inherent in this technology is that the optical cavity of this type of laser gyro is by nature highly unstable. To reduce this instability, controlled optical are introduced into the cavity that depend on the direction of propagation by using acoustooptic devices. Several devices are described, employing different configurations of acoustooptic devices. These devices apply in particular to laser gyros having monolithic cavities, and in particular to neodymium-doped YAG laser gyros.

10 Claims, 11 Drawing Sheets

OTHER PUBLICATIONS

A.V. Dotsenko, et al. "Use of a Feedback Circuit for the Improvement of the Characteristics of a Solid-State Ring Laser", Soviet Journal of Quantum Electronics, Jan. 14, 1984, No. 1, New York, pp. 117-118.

L.S. Kornienko, et al. "Solid-State Ring Laser with Diffraction Acoustooptic Mode Feedback", Scientific Research Institute of Nuclear Physics, vol. 11 Dec. 1981, No. 12, New York, pp. 1557-1559.

* cited by examiner

SOLID-STATE GYROLASER STABILISED BY ACOUSTO-OPTIC DEVICES

BACKGROUND OF THE INVENTION

1. Field of the Invention

The field of the invention is that of solid-state laser gyros used for measuring rotation speeds. This type of equipment is used especially for aeronautical applications.

The laser gyro, developed some thirty years ago, is widely used on a commercial scale at the present time. Its principle of operation is based on the Sagnac effect, which induces a frequency difference $\Delta\nu$ between the two optical transmission modes that propagate in opposite directions, called counterpropagating modes, of a bidirectional laser ring cavity undergoing a rotational motion. Conventionally, the frequency difference $\Delta\nu$ is equal to:

$$\Delta\nu = 4A\Omega/\lambda L$$

where: L and A are the length and the area of the cavity, respectively; $\lambda$ is the laser emission wavelength excluding the Sagnac effect; and $\Omega$ is the rotation speed of the assembly.

The value of $\Delta\nu$ measured by spectral analysis of the beat of the two emitted beams is used to determine the value of $\Omega$ very accurately.

2. Description of the Prior Art

It has also been demonstrated that the laser gyro operates correctly only above a certain rotation speed needed to reduce the influence of intermodal coupling. The rotation speed range lying below this limit is conventionally called the blind zone.

The condition for observing the beat, and therefore for the operation of the laser gyro, is the stability and relative equality of the intensities emitted in the two directions. This is not a priori an easy thing to achieve because of the intermodal competition phenomenon, which means that one of the two counterpropagating modes may have a tendency to monopolize the available gain, to the detriment of the other mode.

This problem is solved in standard laser gyros by the use of a gaseous amplifying medium, generally a helium/neon mixture operating at room temperature. The gain curve of the gas mixture exhibits Doppler broadening due to the thermal agitation of the atoms. The only atoms capable of delivering gain to a given frequency mode are thus those whose velocity induces a Doppler shift in the transition frequency, which brings the atom to resonance with the mode in question. Forcing the laser emission to take place other than at the center of the gain curve (by piezoelectric adjustment of the optical path length) ensures that the atoms at resonance with the cavity have a non-zero velocity. Thus, the atoms that can contribute to the gain in one of the two directions have velocities opposite those of the atoms that can contribute to the gain in the opposite direction. The system therefore behaves as if there were two independent amplifying media, one for each direction. Since intermodal competition has thus disappeared, stable and balanced bidirectional emission occurs (in practice, to alleviate other problems, a mixture consisting of two different neon isotopes is used).

However, the gaseous nature of the amplifying medium is a source of technical complications when producing the laser gyro (especially because of the high gas purity required) and of premature wear during use (gas leakage, deterioration of the electrodes, high voltage used to establish the population inversion, etc.).

At the present time, it is possible to produce a solid-state laser gyro operating in the visible or the near infrared using, for example, an amplifying medium based on neodymium-doped YAG (yttrium aluminum garnet) crystals instead of the helium/neon gas mixture, the optical pumping then being provided by diode lasers operating in the near infrared. It is also possible to use, as amplifying medium, a semiconductor material, a crystalline matrix or a glass doped with ions belonging to the class of rare earths (erbium, ytterbium, etc.). Thus, all the problems inherent with the gaseous state of the amplifying medium are de facto eliminated. However, such a construction is made very difficult to achieve due to the homogeneous character of the broadening of the gain curve of the solid-state media, which induces very strong intermodal competition, and because of the existence of a large number of different operating regimes, among which the intensity-balanced bidirectional regime, called the "beat regime", is one very unstable particular case (N. Kravtsov and E. Lariotsev, "Self-modulation oscillations and relaxations processes in solid-state ring lasers", Quantum Electronics 24(10), 841-856 (1994)). This major physical obstacle has greatly limited hitherto the development of solid-state laser gyros.

To alleviate this drawback, one technical solution consists in attenuating the effects of the competition between counterpropagating modes in a solid-state ring laser by introducing optical losses into the cavity that depend on the direction of propagation of the optical mode and on its intensity. The principle is to modulate these losses by a feedback device according to the difference in intensity between the two transmitted modes in order to favor the weaker mode to the detriment of the other, so as constantly to slave the intensity of the two counterpropagating modes to a common value.

In 1984, a feedback device was proposed in which the losses were obtained by means of an optical assembly essentially composed of an element exhibiting a variable Faraday effect and of a polarizing element (A. V. Dotsenko and E. G. Lariontsev, "Use of a feedback circuit for the improvement of the characteristics of a solid-state ring laser", Soviet Journal of Quantum Electronics 14(1), 117-118 (1984) and A. V. Dotsenko, L. S. Komienko, N. V. Kravtsov, E. G. Lariontsev, O. E. Nanii and A. N. Shelaev, "Use of a feedback loop for the stabilization of a beat regime in a solid-state ring laser", Soviet Journal of Quantum Electronics 16(1), 58-63 (1986)).

The principle of this feedback device is illustrated in FIG. 1. It consists in introducing, into a ring cavity 1 consisting of three mirrors 11, 12 and 13 and an amplifying medium 19, an optical assembly placed in the path of the counterpropagating optical modes 5 and 6, said assembly consisting of a polarizing element 71 and an optical rod 72 exhibiting the Faraday effect, wound with an induction coil 73. At the output of the cavity 1, the two optical modes 5 and 6 are sent to a measurement photodiode 3. One portion of these beams 5 and 6 is taken off by means of the two semireflecting plates 43 and sent to the two photodetectors 42. The signals output by these two photodetectors are representative of the light intensity of the two counterpropagating optical modes 5 and 6. Said signals are sent to an electronic feedback module 4, which generates an electric current proportional to the difference in light intensity between the two optical modes. This electric current determines the value of the losses inflicted at each of the counterpropagating modes 5 and 6. If one of the beams has a higher light intensity than the other, its intensity will be attenuated more, so as to bring the output beams to the same intensity level. Thus, the bidirectional regime is intensity-stabilized.

A solid-state laser gyro can operate, according to this principle, only if the parameters of the feedback device are matched to the dynamics of the system. In order for the feedback device to be able to give correct results, three conditions must be fulfilled:

the additional losses introduced into the cavity by the feedback device must be of the same order of magnitude as the intrinsic losses in the cavity;

the reaction rate of the feedback device must be greater than the rate of variation of the intensities of the emitted modes so that the feedback operates satisfactorily; and finally, the feedback strength of the feedback device must be sufficient for the effect induced in the cavity to effectively compensate for the intensity variations.

The Maxwell-Bloch equations are used to determine the complex amplitudes $E_{1,2}$ of the fields of the counterpropagating optical modes, and also the population inversion density N. These are obtained using a semi-conventional model (N. Kravtsov and E. Lariotsev, "Self-modulation oscillations and relaxations processes in solid-state ring lasers", Quantum Electronics 24(10), 841-856 (1994)).

These equations are:

$$dE_{1,2}/dt = -(\omega/2Q_{1,2})E_{1,2} + i(m_{1,2}/2)E_{2,1} \pm i(\Delta v/2)E_{1,2} + (\sigma/2T)\left(E_{1,2}\int^l N\,dx + E_{2,1}\int^l Ne^{\pm 2ikx}\,dx\right) \quad \text{Equation 1}$$

$$dN/dt = W - (N/T_1) - (a/T_1)N|E_1 e^{-ikx} + E_2 e^{ikx}|^2 \quad \text{Equation 2}$$

where:
the indices 1 and 2 are representative of the two counterpropagating optical modes;
$\omega$ is the laser emission frequency excluding the Sagnac effect;
$Q_{1,2}$ are the quality factors of the cavity in the two propagation directions;
$m_{1,2}$ are the backscattering coefficients of the cavity in the two propagation directions;
$\sigma$ is the effective laser emission cross section;
l is the length of the gain medium traveled;
T=L/c is the transit time of each mode of the cavity;
$k=2\pi/\lambda$ is the norm of the wavevector;
W is the pumping rate;
$T_1$ is the lifetime of the excited level; and
a, the saturation parameter, is equal to $\sigma T_1/8\pi\hbar\omega$.

The right-hand side of equation 1 has four terms. The first term corresponds to the variation in the field due to the losses in the cavity, the second term corresponds to the variation in the field induced by the backscattering of one mode on the other mode in the presence of scattering elements present inside the cavity, the third term corresponds to the variation in the field due to the Sagnac effect, and the fourth term corresponds to the variation in the field due to the presence of the amplifying medium. This fourth term has two components, the first corresponding to the stimulated emission and the second to the backscattering of one mode on the other mode in the presence of a population inversion grating within the amplifying medium.

The right-hand side of equation 2 has three terms, the first term corresponding to the variation in the population inverse density due to the optical pumping, the second term corresponding to the variation in the population inverse density due to the stimulated emission and the third term corresponding to the variation in the population inversion density due to the spontaneous emission.

The mean losses $P_c$ due to the cavity after a complete rotation of the optical mode are consequently:

$P_c = \omega T/2Q_{1,2}$ according to the first term of the right-hand side of equation 1.

The losses introduced by the feedback devices $P_F$ must be of the same order of magnitude as these mean losses $P_C$. In general, these losses are of the order of 1 percent.

The reaction rate of the feedback device may be characterized by the bandwidth $\gamma$ of said feedback device. It has been demonstrated (A. V. Dotsenko and E. G. Lariontsev, "Use of a feedback circuit for the improvement of the characteristics of a solid-state ring laser", Soviet Journal of Quantum Electronics 14 (1), 117-118 (1984) and A. V. Dotsenko, L. S. Komienko, N. V. Kravtsov, E. G. Lariontsev, O. E. Nanii and A. N. Shelaev, "Use of a feedback loop for the stabilization of a beat regime in a solid-state ring laser", Soviet Journal of Quantum Electronics 16(1), 58-63 (1986)), using equations 1 and 2, that a sufficient condition for establishing a stable bidirectional regime above the rotation speed can be written as:

$$\gamma \gg \eta\omega/[Q_{1,2}(\Delta v T_1)^2]$$

where $\eta = (W - W_{threshold})/W$ and $\eta$ corresponds to the relative pumping rate above the threshold $W_{threshold}$.

To give an example, for a relative pumping rate $\eta$ of 10%, an optical frequency $\omega$ of $18 \times 10^{14}$, a quality factor $Q_{1,2}$ of $10^7$, a frequency difference $\Delta v$ of 15 kHz and an excited state lifetime $T_1$ of 0.2 ms, the bandwidth y must be greater than 40 kHz.

In order for the loop to operate correctly, the following relationship must also be satisfied:

$$(\Delta v T_1)^2 \gg 1.$$

Conventionally, the feedback strength q of the feedback device is defined in the following manner:

$$q = [(Q_1 - Q_2)/(Q_1 + Q_2)]/[(I_2 - I_1)/(I_2 + I_1)]$$

where $I_1$ and $I_2$ are the light intensities of the two counterpropagating modes.

In this type of application, it has been demonstrated that the parameter q must be greater than $1/(\Delta v T_1)^2$ in order for the feedback device to be able to operate correctly.

SUMMARY OF THE INVENTION

The subject of our invention is to propose a stabilizing device for a solid-state laser gyro, which comprises a feedback system for introducing optical losses that depend on the propagation direction using the phenomenon of diffraction of a light wave on an acoustic wave. This solution has several significant advantages over the devices of the prior art. It is simple to implement because only a single type of component has to be inserted into the cavity, and particular arrangements allow the attenuation of each of the counterpropagating modes to be controlled almost independently of the other.

More precisely, the subject of the invention is a laser gyro comprising at least an optical ring cavity that includes at least three mirrors, a solid-state amplifying medium and a feedback system, the cavity and the amplifying medium being such that two counterpropagating optical modes can propagate in opposite directions with respect to each other in said optical cavity, the feedback system keeping the intensity of the two counter propagating modes almost the same, characterized in that the feedback system includes at least an acoustooptic modulator inside the cavity, said modulator comprising at least one optical interaction medium placed in the path of the counterpropagating optical modes, and a piezoelectric transducer that generates a periodic acoustic wave in the optical interaction medium.

BRIEF DESCRIPTION OF THE DRAWINGS

The invention will be better understood and other advantages will become apparent on reading the following description given by way of nonlimiting example and from the appended figures in which.

MORE DETAILED DESCRIPTION

Figure 1:
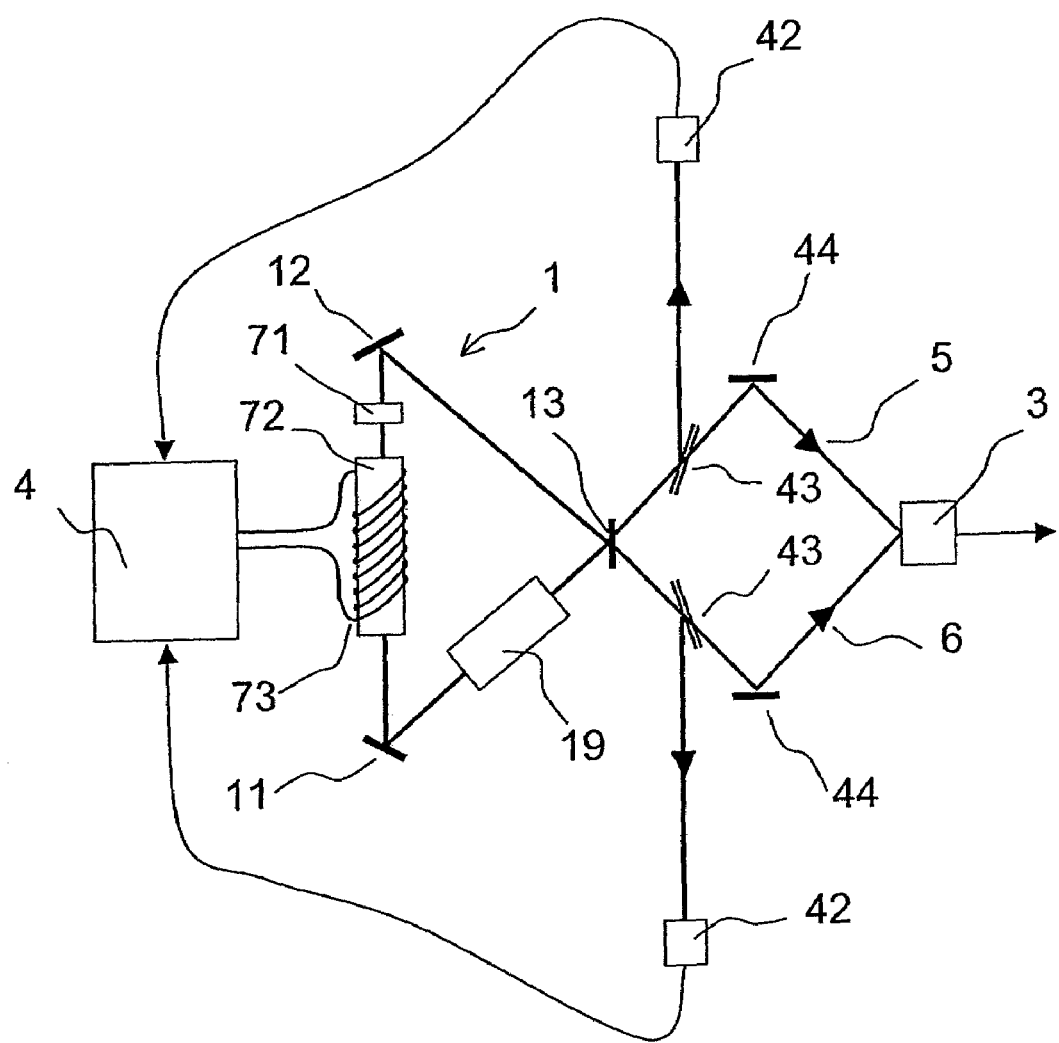
FIG. 1 shows the operating principle of the feedback device according to the prior art.
Figure 2:
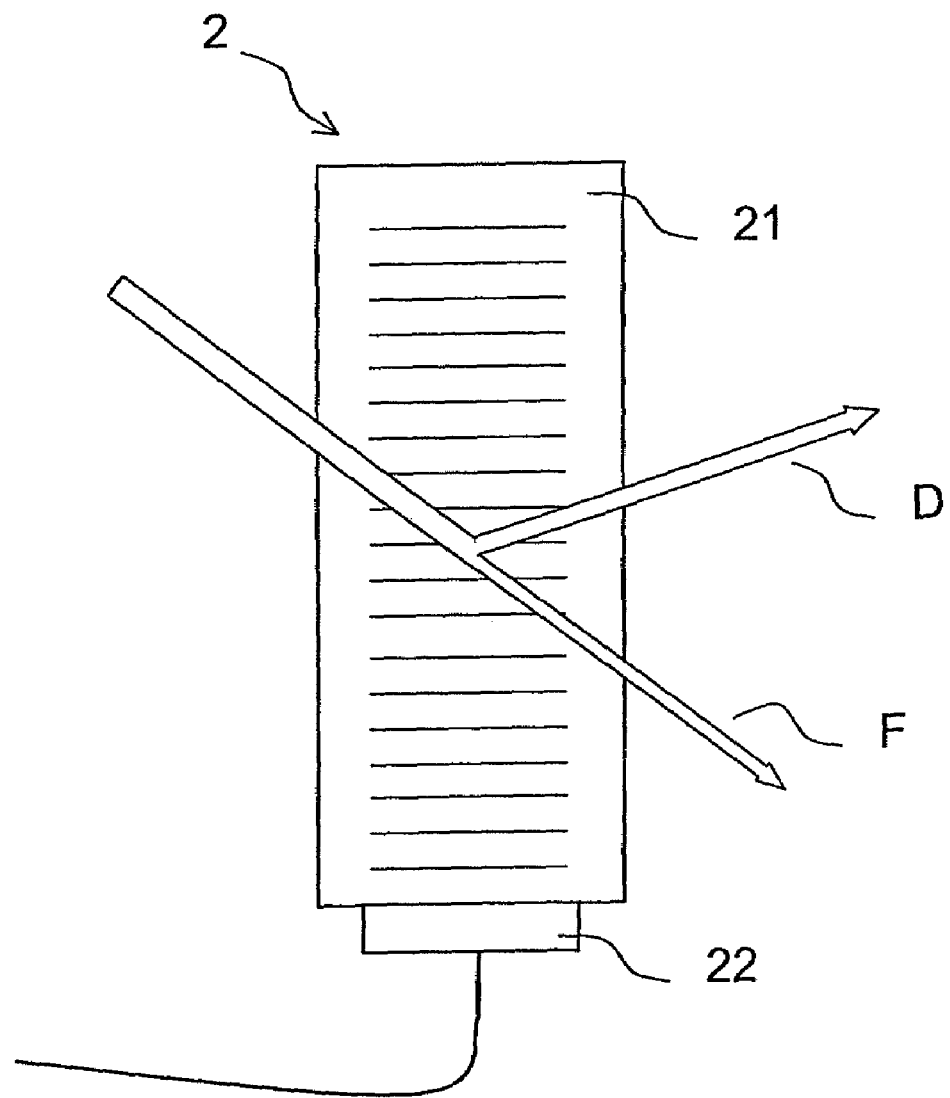
FIG. 2 shows the general principle of diffraction by an acoustooptic modulator.

An acoustooptic modulator 2 essentially comprises a piezoelectric block 22 placed against an interaction medium 21 that is transparent to the optical radiation, as indicated in FIG. 2. The piezoelectric block generates ultrasonic waves that modify the mechanical and optical properties of the interaction medium. More precisely, a periodic modulation of the optical index is produced in the medium, which therefore behaves as an optical diffraction grating. When a light beam F passes through the acoustooptic modulator 2, some of its energy is lost by diffraction. The energy of the diffracted beam D is at maximum when the incident beam has a very particular direction relative to the acoustic wave, called the Bragg angle of incidence. The interaction between these two waves is modeled by the elastic interaction between a photon and a phonon. This interaction involves the conservation of energy and the conservation of momentum.

The usual relationships for obtaining the characteristics of the diffracted beam are generally established by neglecting the frequency shift of the diffracted wave relative to the incident wave in the equation for the conservation of momentum. Losses dependent on the propagation direction of the optical modes cannot therefore be demonstrated since the problem becomes symmetrical.

If this shift is taken into account (R. Roy, P. A. Schulz and A. Walther, Opt. Lett. 12, 672 (1987) and J. Neev and F. V. Kowalski, Opt. Lett. 16, 378 (1991)), it is shown that the Bragg condition for the two counterpropagating modes is different. In other words, the diffraction losses are different for the two counterpropagating modes. This difference in loss is small, but it is sufficient to establish a feedback system for controlling the counterpropagating optical modes.

An optical wave is conventionally characterized by its wavevector k, its angular frequency ω and its wavelength λ.

Figure 3A:
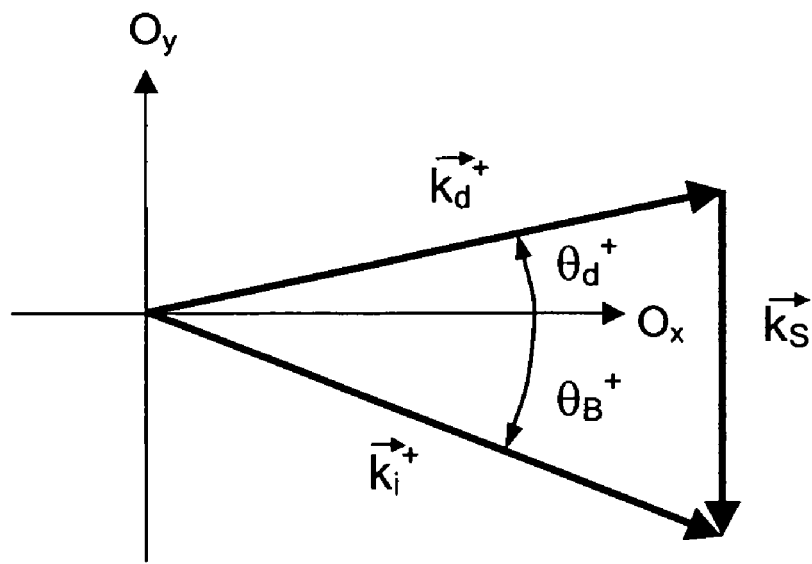
FIGS. 3a and 3b show the construction of the wavevectors of the waves diffracted by an acoustooptic modulator in the forward and reverse propagation directions.

Let an incident wave propagate in a given direction taken arbitrarily as the positive direction, characterized by a wavevector $\vec{k}_i^+$ and a wavelength $\lambda_o$, said wave has an angle of incidence $\theta_B^+$ corresponding to Bragg incidence on an interaction medium of optical index n in which an acoustic wave characterized by a wavevector $\vec{k}_S$, a propagation velocity of the acoustic wave $V_s$, a wavelength $\lambda_S$ and an angular frequency $\omega_S$, propagates. In the interaction medium, the diffracted wave of wave factor $\vec{k}_d^+$ is constructed in the direction $\theta_d^+$ as indicated in FIG. 3a. The following equations may therefore be written:

$$\vec{k}_i^+ = \vec{k}_d^+ + \vec{k}_S \text{ and } \omega_i^+ = \omega_d^+ + \omega_S \text{ with } k_i^+ \frac{c}{n} = \omega_i^+,$$

$$k_d^+ \frac{c}{n} = \omega_d^+ \text{ and } k_S V_S = \omega_S$$

c representing the velocity of light, $k_i^+$, $k_d^+$ and $k_s$ representing the norms of the associated wavevectors.

By projection on the Ox axis perpendicular to the direction of $\vec{k}_S$, the following equation is obtained:

$$k_i^+ \cos(\theta_B^+) = k_d^+ \cos(\theta_d^+) \quad \text{Equation 1}$$

Since the diffracted wave is frequency-shifted upon interaction with the acoustic wave, $k_i^+$ is different from $k_d^+$ and consequently the angle of incidence $\theta_B^+$ is different from the diffraction angle $\theta_d^+$ as shown in FIG. 3a, where this difference has been considerably exaggerated for the sake of clarity.

By projection on the Oy axis parallel to $\vec{k}_S$, the following equation is obtained:

$$-k_i^+ \sin(\theta_B^+) = k_d^+ \sin(\theta_d^+) - k_S \quad \text{Equation 2}$$

Squaring Equation 1 and Equation 2 gives:

$$k_i^{+2} \cos^2(\theta_B^+) = k_d^{+2} \cos^2(\theta_d^+)$$

$$k_i^{+2} \sin^2(\theta_B^+) + k_S^2 - 2k_i^+ k_S \sin^2(\theta_B^+) = k_d^{+2} \sin^2(\theta_d^+)$$

and then adding these two equations gives:

$$k_i^{+2} + k_S^2 - 2k_i^+ k_S \sin(\theta_B^+) = k_d^{+2}$$

$$k_i^{+2} + k_S^2 - k_d^{+2} = 2k_i^+ k_S \sin(\theta_B^+)$$

$$2k_i^+ \sin(\theta_B^+) = \frac{k_i^{+2} - k_d^{+2}}{k_S} + k_S$$

For the incident wave propagating in the opposite direction, taken arbitrarily as the negative direction (FIG. 3b), characterized by its wavevector $\vec{k}_i^-$; and its wavelength $\lambda_o$, the following equations are found in succession:

$$\vec{k}_i^- = \vec{k}_d^- - \vec{k}_S \text{ and } \omega_i^- = \omega_d^- - \omega_S \text{ with } k_i^- \frac{c}{n} = \omega_i^-,$$

$$k_d^- \frac{c}{n} = \omega_d^- \text{ and } k_S V_S = \omega_S$$

$$k_i^- \cos(\theta_B^-) = k_d^- \cos(\theta_d^-)$$

$$k_i^- \sin(\theta_B^-) = -k_d^- \sin(\theta_d^-) + k_S$$

Using the same method as above, the following are obtained in succession:

$$k_i^{-2}\cos^2(\theta_B^-) = k_d^{-2}\cos^2(\theta_d^-)$$

$$k_i^-\sin(\theta_b^-) = -k_d^-\sin(\theta_d^-) + k_S$$

$$k_i^{-2}\sin^2(\theta_B^-) + k_S^2 - 2k_i^- k_S \sin^2(\theta_B^-) = k_d^{-2}\sin^2(\theta_d^-)$$

which gives the equivalent equation for the counterpropagating wave:

$$2k_i^-\sin(\theta_B^-) = \frac{k_i^{-2} - k_d^{-2}}{k_S} + k_S$$

These two equations may also be written in the following simplified form:

$$2k_i^{\pm}\sin(\theta_B^{\pm}) = k_S + \frac{k_i^{\pm 2} - k_d^{\pm 2}}{k_S}$$

The difference between the Bragg angles of incidence therefore gives:

$$k_i^+\sin(\theta_B^+) - k_i^-\sin(\theta_B^-) = \frac{k_i^{+2} - k_i^{-2} + k_d^{-2} - k_d^{+2}}{2k_S} \qquad \text{Equation 3}$$

Since the diffracted waves have different frequencies from the incident waves, the two directions for which the diffraction is a maximum are not identical. There is therefore a nonreciprocal effect, which allows differential losses to be induced.

In the presence of the Sagnac effect, the two counterpropagating waves have similar frequencies, and therefore we may write:

$$k_i^+ \approx k_i^- \equiv k_i,$$

so that the above equation may be written as:

$$\sin(\theta_B^+) - \sin(\theta_B^-) \approx \frac{k_d^{-2} - k_d^{+2}}{2k_S k_i} \qquad \text{Equation 4}$$

This equation can be expressed differently depending on whether or not the modulator is isotropic.

If the modulator is isotropic, with an index n:
the angles in question are small;
conservation of energy gives:

$$\omega_i^+ = \omega_d^+ + \omega_S \text{ with } k_i^+\frac{c}{n} = \omega_i^+, k_d^+\frac{c}{n} = \omega_d^+ \text{ and } k_S V_S = \omega_S$$

i.e. $k_d^+ = k_i - \frac{n}{c}V_S k_S$ $$\omega_i^- = \omega_d^- - \omega_S \text{ with } k_i^-\frac{c}{n} = \omega_i^-, k_d^-\frac{c}{n} = \omega_d^- \text{ and } k_S V_S = \omega_S$$

i.e. $k_d^- = k_i + \frac{n}{c}V_S k_S$ the frequencies are similar, so that they may be made the same in the terms where their difference does not occur.

Therefore:

$$k_d^- \approx k_d^+ \approx k_i^- \approx k_i^+$$

Equation 4 can thus be rewritten as:

$$\theta_B^+ - \theta_B^- \approx \frac{(k_d^- - k_d^+)(k_d^- + k_d^+)}{2k_S k_i} \approx \frac{2k_i(k_d^- - k_d^+)}{2k_S k_i} = \frac{k_d^- - k_d^+}{k_S}$$

$$\theta_B^+ - \theta_B^- = \frac{2\frac{n}{c}V_S k_S}{k_S} = 2n\frac{V_S}{c}$$

Thus, the difference between the directions for which the diffraction is a maximum along the propagation direction depends on the ratio of the velocity of the acoustic wave to the velocity of light in the modulator. Therefore:

$$2k_i^+\sin(\theta_B^+) = \frac{(k_i^+ - k_d^+)(k_i^+ + k_d^+)}{k_S} + k_S$$

$$\sin(\theta_B^+) = \frac{k_S}{2k_i^+} + \frac{(k_i^+ - k_d^+)}{k_S} = \frac{k_S}{2k_i^+} + \frac{n}{c}V_S = \frac{k_S}{2k_i^+} + \frac{1}{2}(\theta_B^+ - \theta_B^-)$$

$$\sin\theta_B = \frac{k_S}{2k_i^+} = \frac{1}{2}(\theta_B^+ + \theta_B^-),$$

and likewise
Thus, the usual Bragg angle of incidence, $$\theta_B = \frac{k_S}{2k_i^+} = \frac{1}{2}(\theta_B^+ + \theta_B^-),$$

corresponds to the angle of incidence midway between $\theta_B^+$ and $\theta_B^-$.

In the case of a nonisotropic modulator, Equations 1, 2 and 4 are still valid. However, the angles are not necessarily small and the equations for the conservation of energy are different.

To give an example, for a uniaxial crystal of ordinary optical index $n_o$ and of extraordinary optical index $n_e$, and in the case in which the acoustic wave and the two incident waves are polarized along the extraordinary axis of index $n_e$ and the diffracted waves are linearly polarized along the ordinary axis of index $n_o$, the conservation of energy gives:

$$\omega_i^+ = \omega_d^+ + \omega_S \text{ with } k_i^+\frac{c}{n_e} = \omega_i^+, k_d^+\frac{c}{n_o} = \omega_d^+ \text{ and } k_S V_S = \omega_S$$

This gives:

$$\frac{c}{n_o}k_d^+ = \frac{c}{n_e}k_i - V_S k_S$$

$$k_d^+ = \frac{n_o}{n_e}k_i - \frac{n_o}{c}V_S k_S$$

$$\omega_i^- = \omega_d^- - \omega_S \text{ with } k_i^-\frac{c}{n} = \omega_i^-, k_d^-\frac{c}{n} = \omega_d^- \text{ and } k_S V_S = \omega_S$$

This gives:

$$\frac{c}{n_o}k_d^- = \frac{c}{n_e}k_i + V_S k_S$$

$$k_d^- = \frac{n_o}{n_e}k_i + \frac{n_o}{c}V_S k_S$$

Equation 4 can therefore be rewritten as:

$$\sin(\theta_B^+) - \sin(\theta_B^-) \approx \frac{(k_d^- - k_d^+)(k_d^- + k_d^+)}{2k_S k_i} \approx \frac{2k_i \frac{n_o}{n_e}(k_d^- + k_d^+)}{2k_S k_i} = 2\frac{n_0^2}{n_e}\frac{V_S}{c}$$

Thus, the modulator behaves as a birefringent uniaxial material, the angles of incidence for which the diffraction is a maximum being different and dependent on the ordinary and extraordinary indices. As in the case of an isotropic material, this difference is the origin of the nonidentical losses in the propagation directions of the waves.

The equations above were established for the first order of diffraction, when only a single acoustic phonon is involved in the elastic photon/phonon scattering. However, it is also possible to establish equivalent equations with elastic scattering involving several phonons.

In the particular case of collinear interaction in a nonisotropic or birefringent medium, that is to say in which the different wavevectors all have the same direction, it is possible to calculate the variations in frequency of the counter-propagating waves.

Figure 3B:
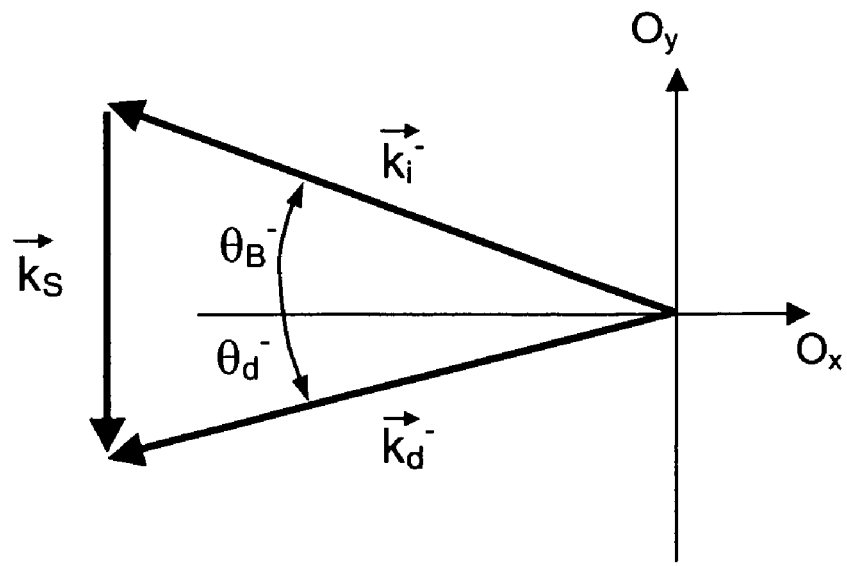

To give an example, in the case of a nonisotropic modulator, for one acoustic wave and two incident waves polarized along the extraordinary axis of index $n_e$ taken as smaller than the ordinary index $n_o$ and the diffracted waves being linearly polarized along the ordinary axis of index $n_o$, then the conservation of energy and the conservation of momentum give:

$$\begin{cases} \vec{k}_i^- = \vec{k}_d^- - \vec{k}_S \\ \omega_i^- = \omega_d^- - \omega_S \end{cases} \text{ with } \vec{k}_i^- = -k_i^- \begin{vmatrix} 1 \\ 0 \\ 0 \end{vmatrix}, \vec{k}_d^- = -k_d^- \begin{vmatrix} 1 \\ 0 \\ 0 \end{vmatrix} \text{ et } \vec{k}_S = k_S \begin{vmatrix} 0 \\ 0 \\ 1 \end{vmatrix}$$

the vectors being referenced in the sentence system defined in FIGS. 3a and 3b. This results, for the wave propagating in the positive direction, in:

$$\begin{cases} k_i^+ = k_d^+ + k_S \\ \frac{c}{n_e}k_i^+ = \frac{c}{n_0}k_d^+ + V_S k_S \end{cases} \quad \text{Equation 5}$$

i.e. $\begin{cases} \frac{c}{n_e}k_i^+ = \frac{c}{n_0}(k_i^+ - k_S) + V_S k_S \\ c\left(\frac{1}{n_o} - \frac{1}{n_e}\right)k_i^+ = \frac{c}{n_0}k_S\left(1 - n_0\frac{V_S}{c}\right) \end{cases} \quad k_i^+ = \frac{1 - n_0\frac{V_S}{c}}{1 - \frac{n_o}{n_e}}k_S$ The case of the wave propagating in the reverse direction gives:

$$\begin{cases} \vec{k}_i^- = \vec{k}_d^- - \vec{k}_S \\ \omega_i^- = \omega_d^- - \omega_S \end{cases} \quad \text{Equation 6}$$

with $\vec{k}_i^- = -k_i^- \begin{vmatrix} 1 \\ 0 \\ 0 \end{vmatrix}, \vec{k}_d^- = -k_d^- \begin{vmatrix} 1 \\ 0 \\ 0 \end{vmatrix}$ and $\vec{k}_s = k_S \begin{vmatrix} 0 \\ 0 \\ 1 \end{vmatrix}$ and therefore:

$$\begin{cases} -k_i^- = -k_d^- - k_S \\ \frac{c}{n_e}k_i^- = \frac{c}{n_0}k_d^- - V_S k_S \end{cases}$$

i.e. $\begin{cases} \frac{c}{n_e}k_i^- = \frac{c}{n_0}(k_i^- - k_S) - V_S k_S \\ c\left(\frac{1}{n_e} - \frac{1}{n_o}\right)k_i^- = -\frac{c}{n_o}k_S\left(1 + n_o\frac{V_S}{c}\right) \end{cases} \quad k_i^- = \frac{1 + n_o\frac{V_S}{c}}{1 - \frac{n_o}{n_e}}k_S$ Since the frequencies in the two directions are different, here again there is a nonreciprocal effect.

The expression for the losses $L_d^+$ and $L_d^-$ as a function of the angle of incidence, which are introduced by an acoustic wave of intensity $I_A$ interacting over a length l with the optical wave propagating in the forward (positive) direction and in the opposite (negative) direction in a modulator, is given by:

$$L^{\pm} = \sin^2(\beta l)\mathrm{sinc}^2\left(\beta l\sqrt{1 + \left(\frac{\pi}{\beta\lambda_S}(\theta_i - \theta_B^{\pm})\right)^2}\right) \approx \beta^2 l^2 \mathrm{sinc}^2\left(\pi\frac{l}{\lambda_S}(\theta_i - \theta_B^{\pm})\right)$$

where sinc(A) is the cardinal sine of the function A and $$\beta = \frac{\pi}{\lambda}\sqrt{\frac{Ml_A}{2}},$$

where M is a figure of merit. Thus:

$$M = \frac{n^6 p^2}{\rho V_S^3}$$

(where p is the photoelastic coefficient and p is the density of the optical interaction material), assuming that $$\frac{\pi}{\beta\lambda_S}(\theta_i - \theta_B^+) \gg$$

and that the acoustic power remains low, something which is the case in the desired application.

Figure 4A:
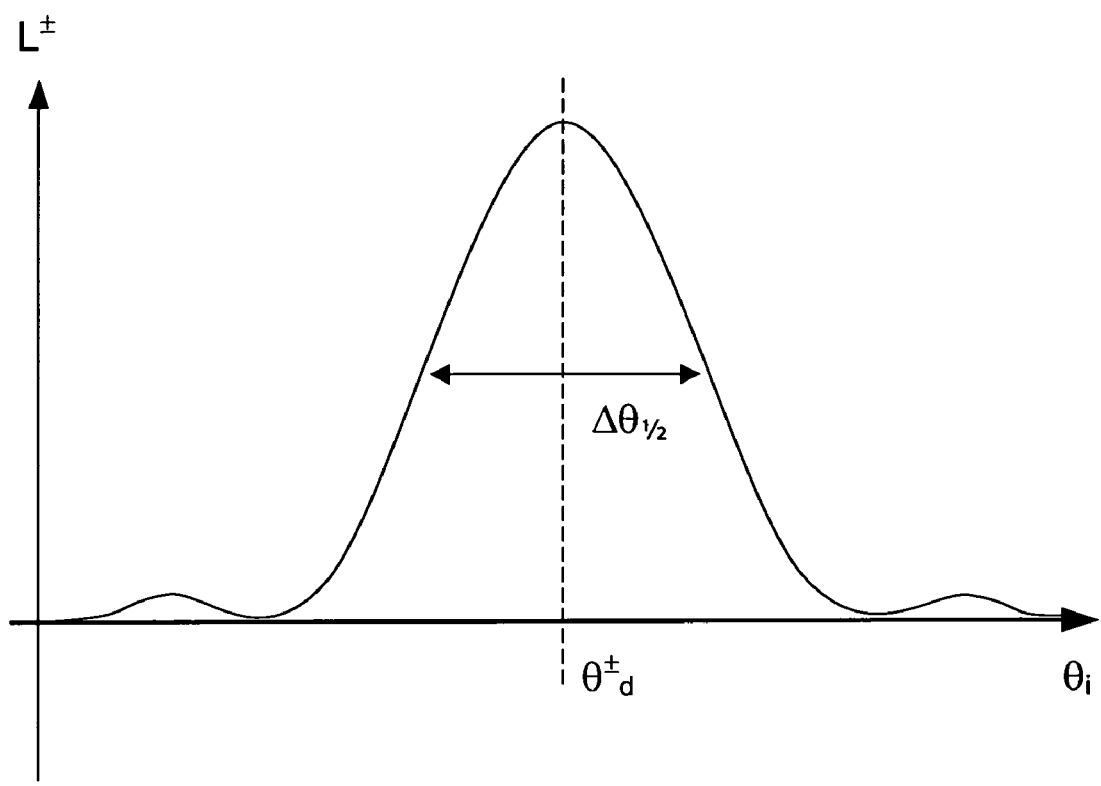
FIGS. 4a and 4b show the diffraction efficiencies as a function of the angle of incidence and as a function of the frequency.

FIG. 4a shows the general form of the losses $L^{\pm}$ as a function of the angle of incidence $\theta^{\pm}$. The losses are a maximum for the Bragg angle of incidence $\theta_d^{\pm}$. The full width at mid-height $\Delta\theta_{1/2}$ is given by the equation:

$$\Delta\theta_{1/2} = 0.89\lambda_S/l.$$

$L^-$ has the same form as $L^+$, but it is offset in terms of angle of incidence.

The operating principle of the device according to the invention is based on this effect. At a given angle of incidence, the losses are therefore different in the direction of rotation of the propagating optical modes. By varying the angle of incidence, the losses vary differently, thus allowing the intensity of the modes to be slaved to a common value. It is possible to create different losses in the propagation directions that are greater the more the curves are offset. The normalized difference in the losses $\Delta L = L^+ - L^-$ is given by:

$$\frac{L^+ - L^-}{\beta^2 l^2} = \frac{L^+ - L^-}{L_{Max}} = \mathrm{sinc}^2\left(\pi \frac{l}{\lambda_S}(\theta_i - \theta_B^+)\right) - \mathrm{sinc}^2\left(\pi \frac{l}{\lambda_S}(\theta_i - \theta_B^-)\right)$$

$$\frac{\Delta L}{L_{Max}} \approx 2\mathrm{sinc}\left(\pi \frac{1}{\lambda_S}(\theta_i - \theta_B)\right)$$

$$\left(\mathrm{sinc}\left(\pi \frac{1}{\lambda_S}(\theta_i - \theta_B)\right) - \cos\left(\pi \frac{l}{\lambda_S}(\theta_i - \theta_B)\right)\right)\frac{\theta_B^+ - \theta_B^-}{\theta_i - \theta_B}$$

Since the angles $\theta_B^+$ and $\theta_B^-$ are close to $\theta_B$, an expansion limited to the first order gives:

$$\mathrm{sinc}^2\left(\pi \frac{l}{\lambda_S}(\theta_i - \theta_B^\pm)\right) \approx$$

$$\mathrm{sinc}^2\left(\pi \frac{l}{\lambda_S}(\theta_i - \theta_B)\right) + \frac{d}{d\theta_B^\pm}\left(\frac{\sin\left(\pi \frac{l}{\lambda_S}(\theta_i - \theta_B^\pm)\right)}{\pi \frac{l}{\lambda_S}(\theta_i - \theta_B^\pm)}\right)_{\theta_B^\pm = \theta_B}(\theta_B - \theta_B^\pm)$$

i.e. $\frac{L^+ - L^-}{L_{Max}} \approx \frac{d}{d\theta_B^\pm}\left(\frac{\sin\left(\pi \frac{l}{\lambda_S}(\theta_i - \theta_B^\pm)\right)}{\pi \frac{l}{\lambda_S}(\theta_i - \theta_B^\pm)}\right)_{\theta_B^\pm = \theta_B}(\theta_B^- - \theta_B^+)$ Since:

$$\frac{d}{d\theta_i}\left(\frac{\sin\left(\pi \frac{l}{\lambda_S}(\theta_i - \theta_B^+)\right)}{\pi \frac{l}{\lambda_S}(\theta_i - \theta_B^+)}\right) = 2\pi \frac{l}{\lambda_S}\left(\frac{\cos\left(\pi \frac{l}{\lambda_S}(\theta_i - \theta_B^+)\right)}{\pi \frac{l}{\lambda_S}(\theta_i - \theta_B^+)} - \frac{\sin\left(\pi \frac{l}{\lambda_S}(\theta_i - \theta_B^+)\right)}{\left(\pi \frac{l}{\lambda_S}(\theta_i - \theta_B^+)\right)^2}\right)$$

$$\mathrm{sinc}\left(\pi \frac{l}{\lambda_S}(\theta_i - \theta_B^+)\right)$$

$$= 2\left(\cos\left(\pi \frac{l}{\lambda_S}(\theta_i - \theta_B^+)\right) - \mathrm{sinc}\left(\pi \frac{l}{\lambda_S}(\theta_i - \theta_B^+)\right)\right)$$

$$\mathrm{sinc}\left(\pi \frac{l}{\lambda_S}(\theta_i - \theta_B^+)\right)\frac{1}{\theta_i - \theta_B^+};$$

then:

$$\frac{\Delta L}{L_{Max}} \approx 2\mathrm{sinc}\left(\pi \frac{1}{\lambda_S}(\theta_i - \theta_B)\right)\left(\mathrm{sinc}\left(\pi \frac{1}{\lambda_S}(\theta_i - \theta_B)\right) - \cos\left(\pi \frac{l}{\lambda_S}(\theta_i - \theta_B)\right)\right)\frac{\theta_B^+ - \theta_B^-}{\theta_i - \theta_B}$$

This difference is a maximum for $\theta_i - \theta_B = \pm 0.415 \lambda_S/l$ and therefore:

$$\frac{\Delta L}{L_{Max}} \approx 1.7 \frac{l}{\lambda_S}(\theta_B^+ - \theta_B^-).$$

(W. A. Clarkson, A. B. Neilson and D. C. Hanna, "Explanation of the mechanism for acousto-optically induced unidirectional operation of a ring laser", Opt. Lett, 17, 601 (1992); W. A. Clarkson, A. B. Neilson and D. C. Hanna, "Unidirectional operation of a ring laser via the acoustooptic effect", IEEE J.Q.E 32, 311 (1996)).

The full width at mid-height of the losses $L^\pm$ is:

$$\Delta\theta_{1/2} = 0.89 \lambda_S/l = 0.89 V_s/lf_s.$$

The system will be more sensitive the larger the ratio of the difference $\Delta\theta_B$ between the angles of incidence $\theta_B^+$ and $\theta_B^-$ to $\Delta\theta_{1/2}$. Therefore:

$$\frac{\Delta\theta_B}{\Delta\theta_{1/2}} = \frac{2\frac{nV_S}{c}}{0.89\frac{V_S}{lf_S}} = \frac{nlf_S}{0.44c}$$

An optimized modulator operates at the highest possible frequency and has the greatest possible interaction length. The high-index materials that increase the ratio are to be considered on a case-by-case basis, as they generally exhibit substantial scattering.

Figure 4B:
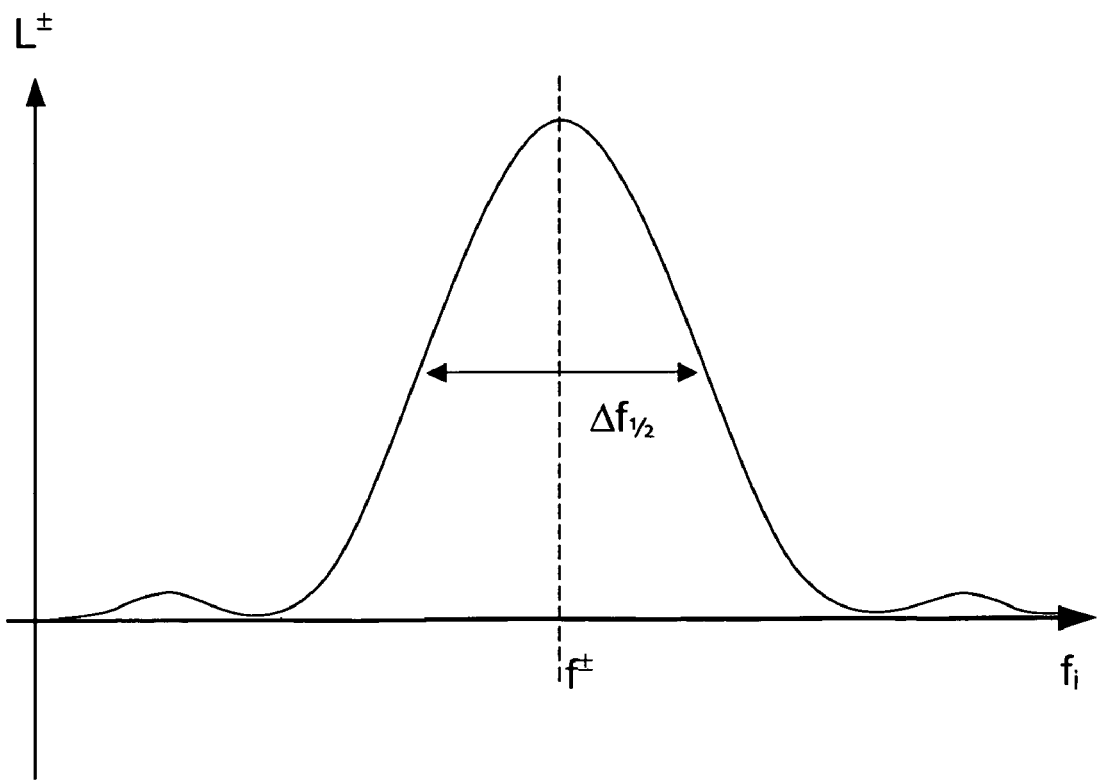

It is also possible to vary the wavelength $\lambda_S$ of the acoustic wave by varying the modulation frequency f delivered by the piezoelectric block. A change in the frequency applied to the piezoelectric block of the modulator changes the angle for which the diffraction is a maximum by an amount proportional to this frequency difference. Thus, changing the frequency applied to a modulator has the same effect as rotating it—the diffraction efficiency is therefore changed. In this case, for a given angle of incidence, the losses vary as a function of this modulation frequency, as indicated in FIG. 4b. Therefore:

$$L^+ \approx \beta^2 l^2 \mathrm{sinc}^2\left(\frac{\pi}{2}\frac{\lambda l}{V_S^2} f_B^+ (f - f_B^+)\right) \text{ and}$$

$$L^- \approx \beta^2 l^2 \mathrm{sinc}^2\left(\frac{\pi}{2}\frac{\lambda l}{V_S^2} f_B^- (f - f_B^-)\right)$$

where $f_B^\pm$ corresponds to the frequency that gives the maximum losses. At this frequency, the angle of incidence of the wave on the modulator is the Bragg angle of incidence.

The variations $(\Delta f_S)_B$ and $(\Delta f_S)_{1/2}$ corresponding to the angular ranges $\Delta\theta_B$ and $\Delta\theta_{1/2}$, respectively, are related through the equation:

$$\frac{(\Delta f_S)_B}{(\Delta f_S)_{1/2}} = \frac{\Delta\theta_B}{\Delta\theta_{1/2}} = \frac{nlf_S}{0.44c}$$

As demonstrated above, when an acoustooptic device is placed in the path of two counterpropagating waves, the diffraction losses vary with the direction of propagation. To establish a feedback system for introducing different losses into each of the two optical beams, there are two possible methods of operating the device according to the invention. It is possible either to vary the angle of incidence or to vary the frequency of the acoustooptic device. To vary the angle of incidence requires mechanical devices that are rotationally slaved. In contrast, to vary the frequency, purely electronic means are employed. It is therefore possible, through a control circuit sensitive to the difference between the intensities $I^+$ and $I^-$ of the two counterpropagating modes, to control the frequency applied to the modulator in order to give preference to the weaker wave, and thus achieve stable two-directional emission.

Figure 5:
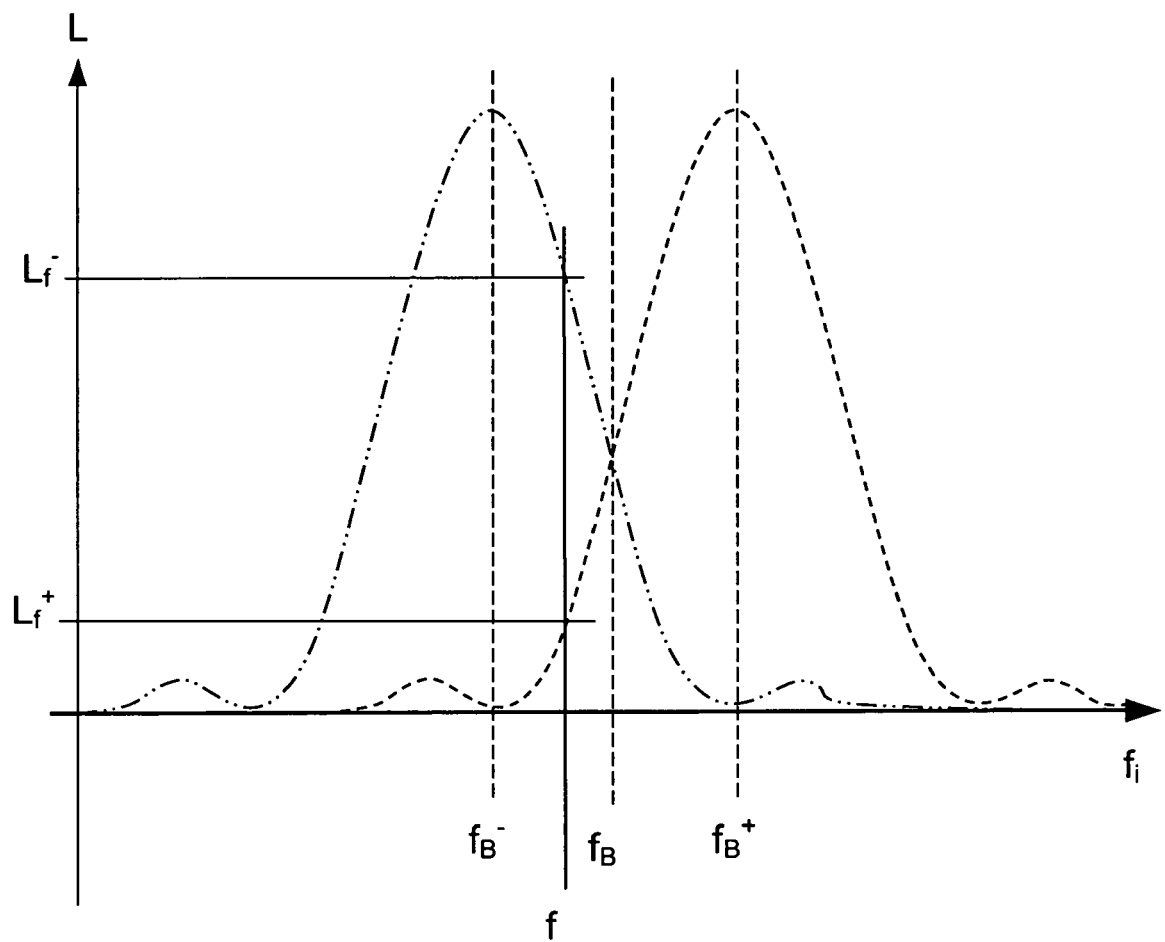
FIG. 5 compares the diffraction losses of the two counterpropagating optical modes.

One particularly favorable case is shown in FIG. 5. In this case, the width of the diffraction pattern is similar to the difference between $f_B^-$ and $f_B^+$. The operating point corresponding to the applied frequency, equal to $f_B$, is ideally placed insofar as:

the losses are minimized; and the slope at this point is greatest, which optimizes the sensitivity and linearizes the system.

As indicated in FIG. 5, any frequency change greatly increases the losses in one mode and decreases the losses in the counterpropagating mode.

When the curves are not offset so much, the feedback mechanism is more complex to implement as it is necessary to go beyond the extremum of one of the two curves in order to achieve a sufficient difference between the losses. Passing beyond the extremum makes the system nonlinear.

It should be noted that the power of the signal to be applied to the modulator is low, and much less than the power needed to trigger a laser (Q-Switch) or to block in-phase optical modes. This device also has the advantage of being able to easily adjust the absolute value of the losses by modifying the power of the acoustic wave. Advantageously, the two counterpropagating waves pass as close as possible to that edge of the modulator from which the acoustic wave is generated, so as to reduce the delay due to the propagation of the acoustic wave up to the optical modes.

Various possible embodiments exist.

Figure 6:
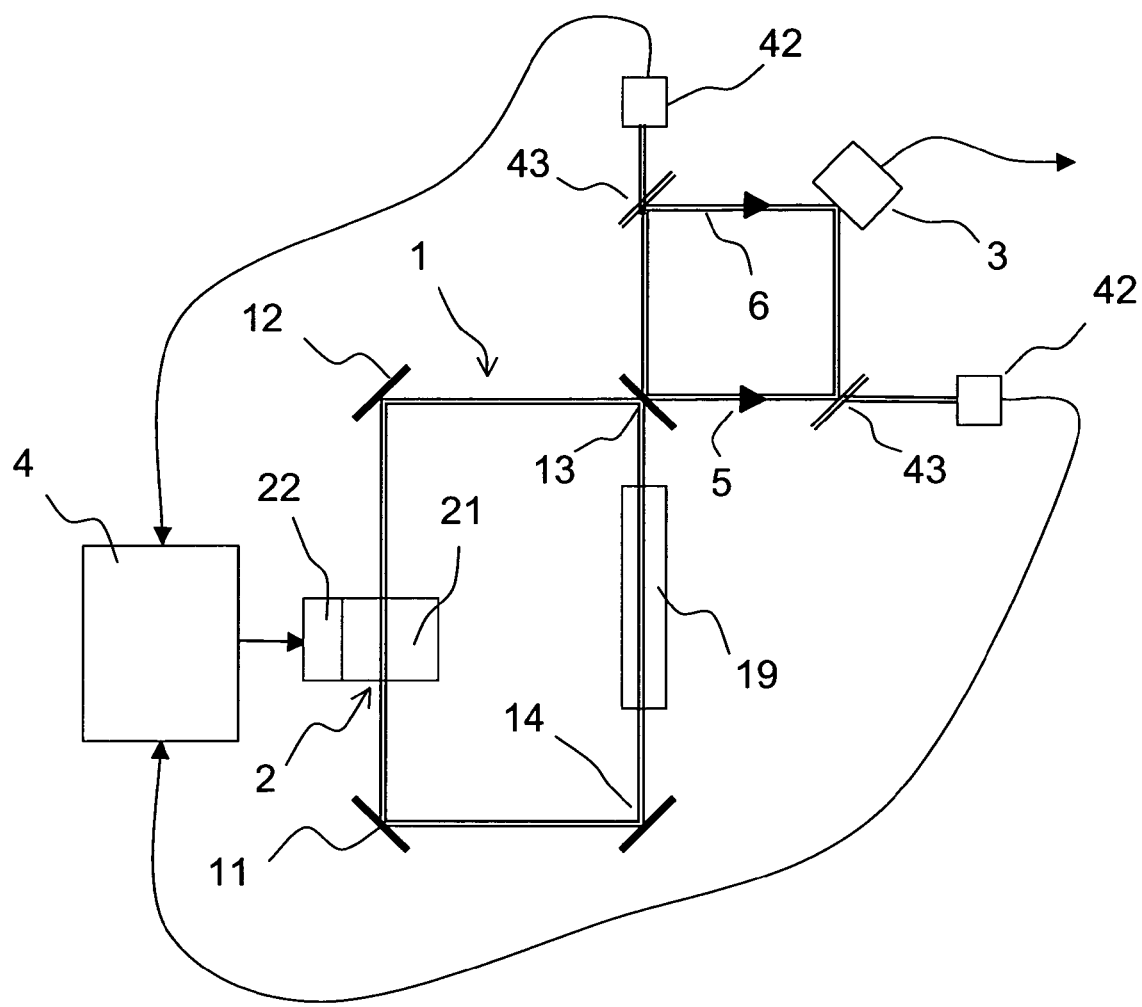
FIG. 6 shows a general diagram of the laser gyro according to the invention.

In a first embodiment based on frequency feedback, the laser gyro is made up of discrete components as indicated in FIG. 6. The cavity therefore comprises a set of mirrors (11, 12, 13 and 14) arranged in a ring. In FIG. 6, the mirrors are arranged at the four corners of a rectangle. Of course, this arrangement is given as an example, and any other arrangement known to those skilled in the art may be suitable. It includes an amplifying medium 19, which may be a neodymium-doped YAG crystal or any other lasing medium. It also includes the modulator 2 which is controlled by the feedback device 4 and is connected to the detectors 42. The modulator 2 comprises an optical interaction medium 21 and a piezoelectric transducer 22. The acoustic waves generated by the transducer may be transverse or longitudinal waves. Two counterpropagating optical modes 5 and 6 propagate in the cavity. They are frequency-offset by the Sagnac effect when the laser gyro is rotating. One fraction of these two modes is transmitted by the mirror 13 and recombined on the photosensitive detector 3 by means of the semireflecting plates 43. The signal output by this photodetector provides the measurement of the rotation speed of the device. The semireflecting plates 43 transmit a portion of the modes 5 and 6 to the detectors 42 that are coupled to the feedback device 4. The difference between the two intensities output by the two detectors controls the feedback loop. The acoustooptic modulator is supplied with a signal whose frequency varies so as to reduce the diffraction losses in the mode of lower intensity and to increase the losses in the mode of higher intensity.

Figure 7A:
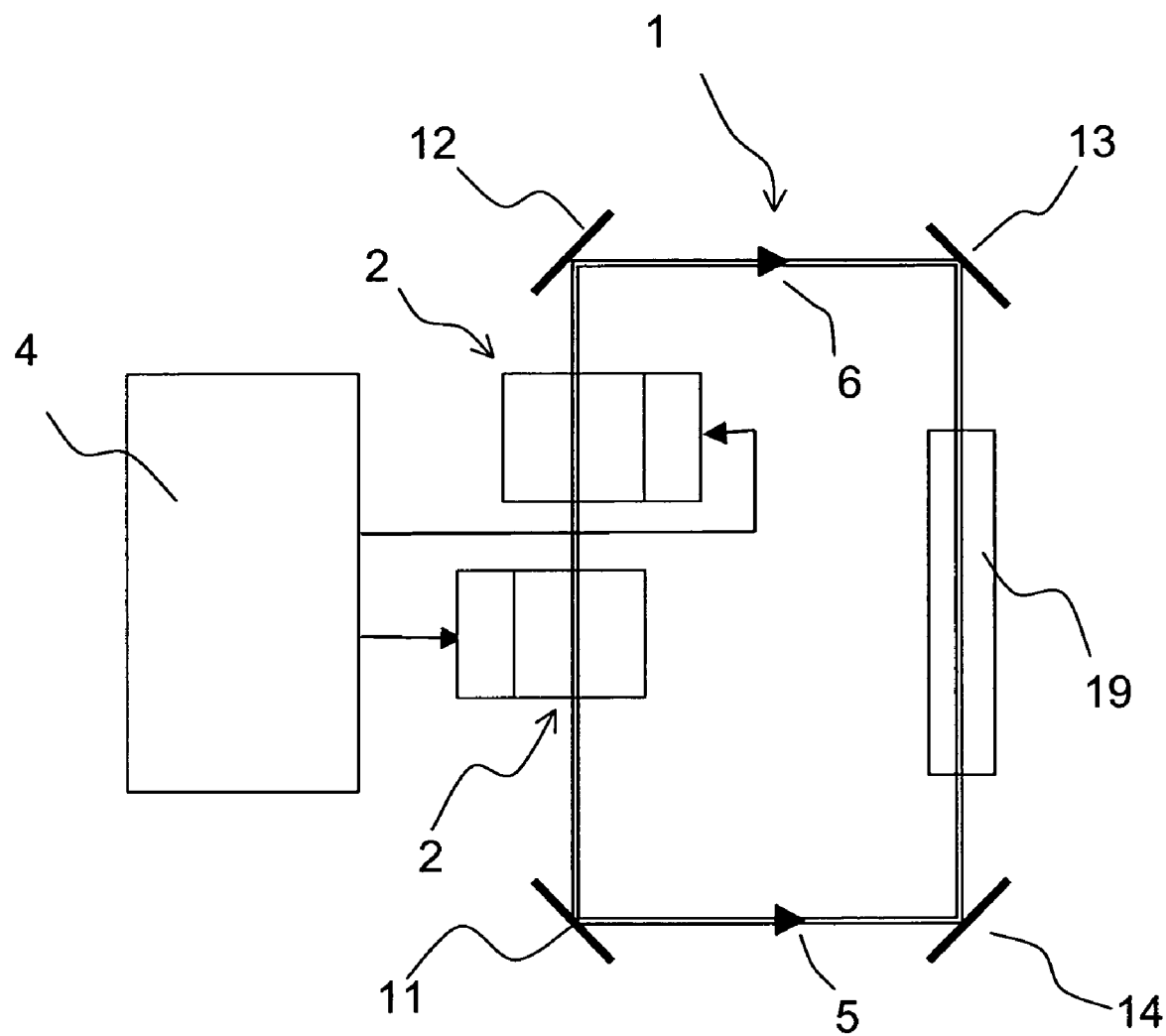
FIGS. 7a and 7b show first and second alternative embodiments of the device according to the invention, which include two acoustooptic modulators.
Figure 7B:
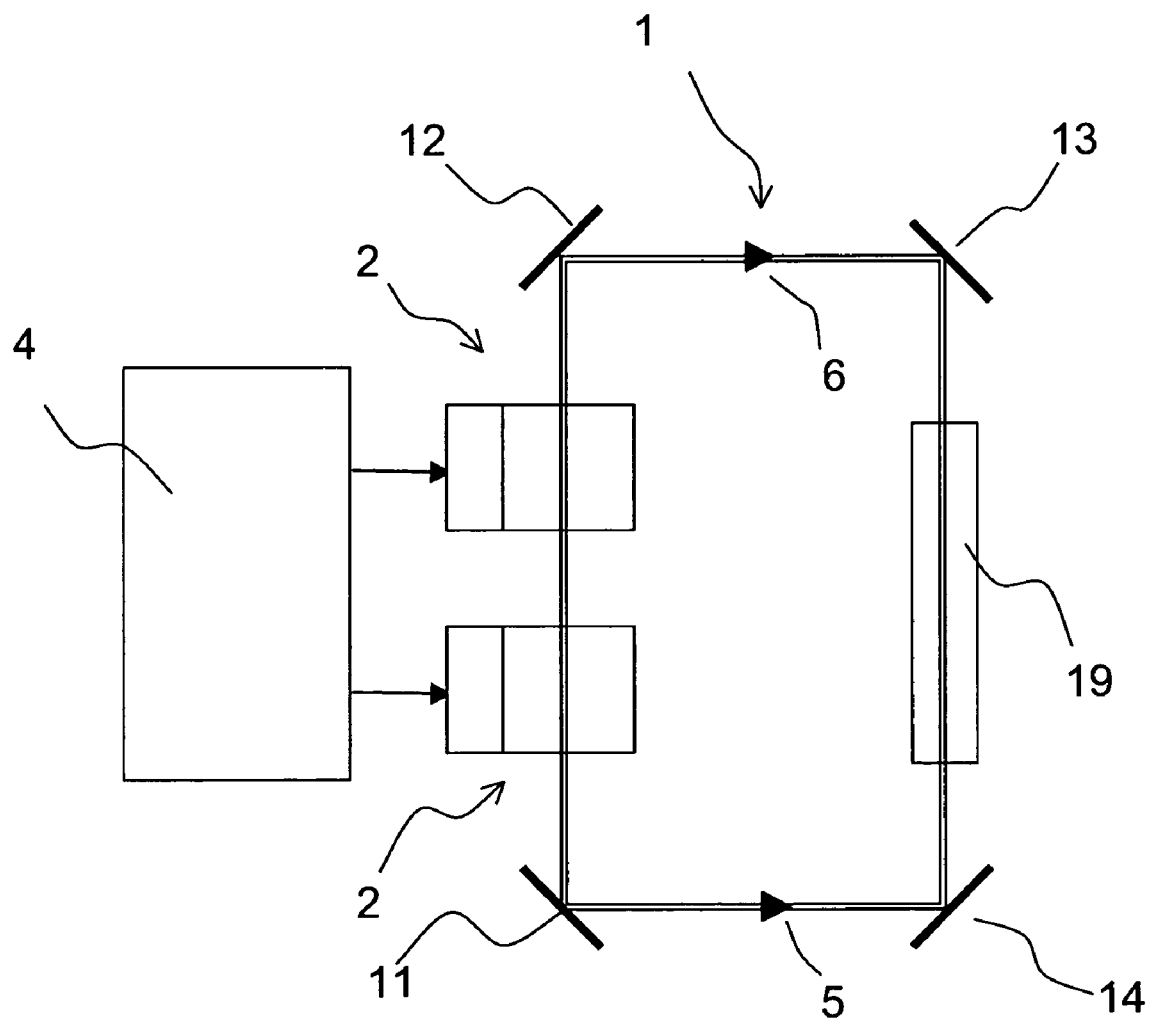

In an alternative embodiment of this arrangement, it is advantageous to place several modulators inserted into the cavity in order to control the intensity of the two waves as indicated in FIGS. 7a and 7b.

This arrangement is beneficial when the device works at high frequency. This is because the losses increase with frequency. Above a certain value, the interaction length 1 between the optical waves and the acoustic wave decreases as the piezoelectric blocks must have increasingly small dimensions to generate the acoustic wave at the correct frequency. The divergence of the acoustic wave also increases, and therefore contributes to decreasing the interaction length. Thus, by increasing the number of modulators, the interaction length is increased (FIG. 7b).

An advantageous alternative embodiment is one in which two piezoelectric blocks are placed on each side of the modulator as shown in FIG. 7a. Optionally, the blocks are offset so as to prevent the acoustic waves interfering with each other. The advantage of this geometry lies in the fact that each acoustic wave gives preference to a different wave. In the ideal case in which the modulators generate two parallel acoustic columns, the intensity will be controlled via the power of each acoustic wave. If the acoustic columns are not parallel, because of a fault in the production of the interaction medium or in the way the blocks are mounted, each modulator is then supplied with a signal at a different frequency so that the differential losses are the same (in absolute value) at the same or similar acoustic power. The applied frequencies are chosen so as to generate optimum losses, that is to say the first block produces high losses in one wave and low losses in the wave propagating in the opposite direction, while the second block has the opposite effect. Thus, the losses in each wave are controlled separately, whereas in a device having only a single acoustooptic modulator it is necessary to act on the optical waves simultaneously.

Figure 8:
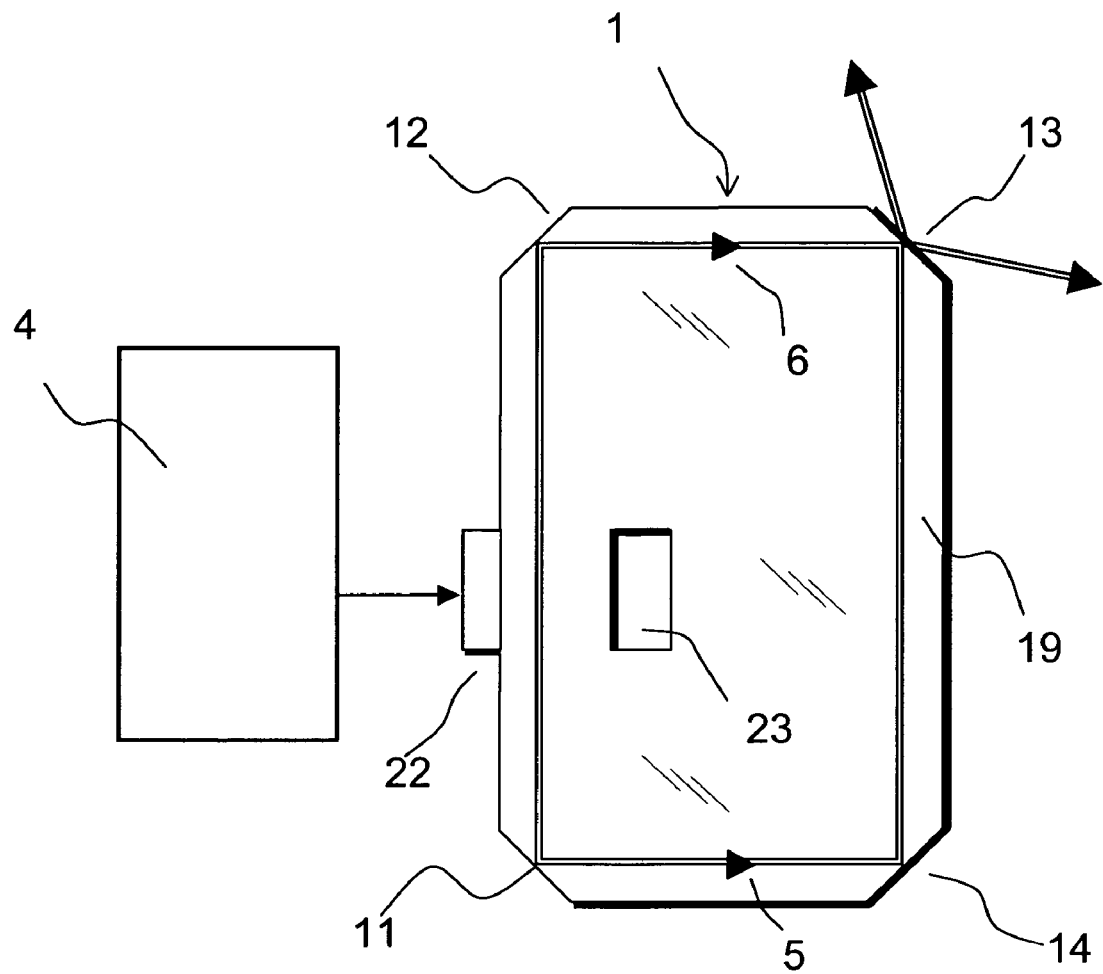
FIG. 8 shows a monolithic laser cavity that includes a device according to the invention.

In a second embodiment illustrated in FIG. 8, the cavity made from discrete components is replaced with a monolithic cavity produced, for example, in a block of YAG (yttrium aluminum garnet) crystal. One facet 13 of the crystal acts as output mirror, while the other facets (11, 12, 14) are perfectly reflecting, it being possible for one of them to be treated so as to favor linear polarization of the light. The acoustic wave may be generated directly, for example by means of a piezoelectric block 22, or by any other means known to those skilled in the art, on one side of the cavity. However, it is necessary in this type of embodiment to prevent the wave, during one complete rotation, from interacting with the acoustic column twice, as this would cancel out the differential losses. In this case, it is easy to see that the two waves both encountering the acoustic column twice, once in one direction and a second time in the other direction, undergo the same losses and the nonreciprocal effect is lost. The acoustic wave is therefore blocked, for example by means of an aperture or several apertures 23 in the cavity (FIG. 8) or by means of any other device that absorbs the acoustic wave.

Figure 9:
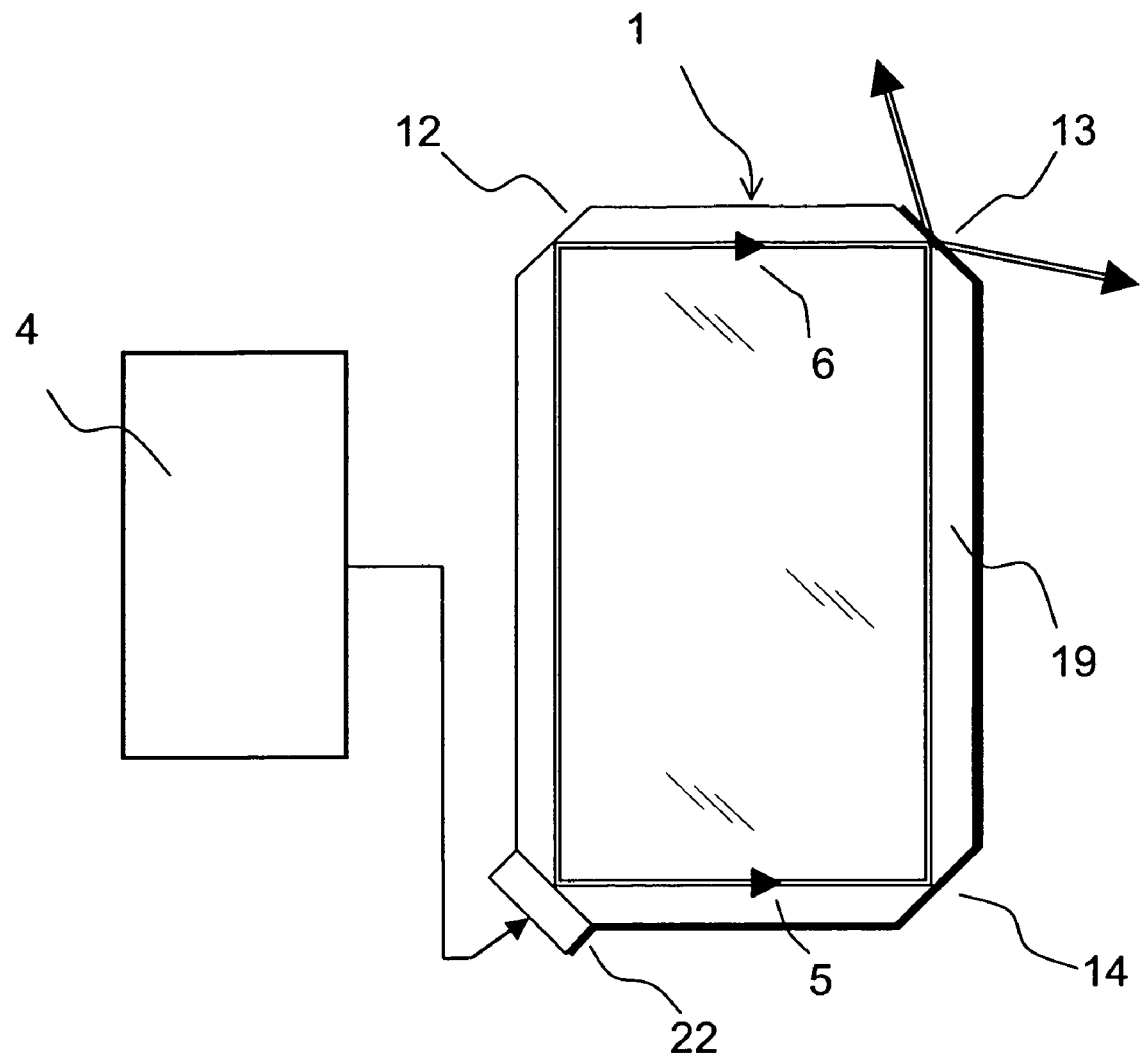
FIG. 9 shows an alternative embodiment of the previous device.

It is also possible to place the piezoelectric block on one of the facets of the cavity as illustrated in FIG. 9.

Figure 10:
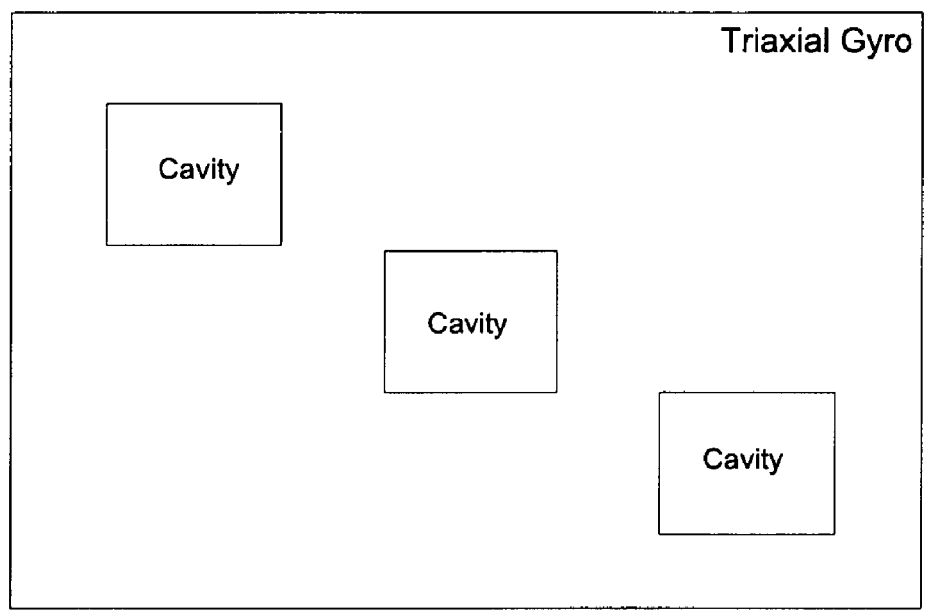
FIG. 10 dipicis a triaxial gyro embodiment according to the invention.

One of the advantages of this configuration is the possibility of producing what is called a triaxial gyro (see FIG. 10) sensitive to rotation speeds along three mutually perpendicular axes, for example by adapting the polyhedral geometry developed for He—Ne laser gyros.

The invention claimed is:

1. A laser gyro comprising:
   an optical ring cavity that includes:
   at least three mirrors,
   a solid-state amplifying medium; and
   a feedback system,
   wherein the cavity and the amplifying medium are such that two counterpropagating optical modes propagate in opposite directions with respect to each other in said optical cavity, the feedback system keeping the intensity of the two counterpropagating modes substantially the same, and
   wherein the feedback system includes:
   at least a first and second acoustooptic modulator inside the cavity, each said modulator comprising at least one optical interaction medium and a piezoelectric transducer that generates a periodic acoustic wave in the optical interaction medium;
   a first electronic means for generating a first acoustic wave controlling the first modulator; and
   a second electronic means for generating a second acoustic wave controlling the second acoustooptic modulator, the first acoustooptic modulator and the second modulator being mounted side by side and head to tail.

2. The laser gyro as claimed in claim 1, wherein said first electronic means and said second electronic means deliver different acoustic power levels.

3. The laser gyro as claimed in claim 1, wherein the acoustic wave generated in the first acoustooptic modulator has a first frequency and the acoustic wave generated in the second acoustooptic modulator has a second frequency different from the first frequency.

4. The laser gyro as claimed in claim 1, wherein the amplifying medium and the optical interaction medium are one and the same medium.

5. The laser gyro as claimed in claim 1, wherein the cavity is monolithic and the counterpropagating modes propagate only in a solid material inside the cavity.

6. The laser gyro as claimed in claim 5, wherein the piezoelectric transducer is mounted on one of the faces of the monolithic cavity.

7. The laser gyro as claimed in claim 6, wherein said face on which said piezoelectric transducer is mounted is also used as a deflection mirror for the counterpropagating optical modes.

8. The laser gyro as claimed in claim 4, wherein a monolithic cavity includes attenuation means for attenuating the acoustic waves so that they interact only once with the counterpropagating optical modes.

9. The laser gyro as claimed in claim 8, wherein said attenuation means is at least one aperture made in the cavity, said aperture being located in the propagation direction of the acoustic waves emitted.

10. The laser gyro as claimed in claim 1, wherein said laser gyro is triaxial and is sensitive to rotation speeds along three mutually perpendicular axes.

* * * * *